Oct. 5, 1965 A. WALZ 3,209,374

SUPPORTING FRAME FOR BABY BATHTUB

Filed Jan. 7, 1963

United States Patent Office

3,209,374

Patented Oct. 5, 1965

3,209,374

SUPPORTING FRAME FOR BABY BATHTUB

Alfons Walz, Biberacher Strasse 89, Bad Waldsee, Wurttemberg, Germany

Filed Jan. 7, 1963, Ser. No. 249,946
Claims priority, application Germany, Jan. 13, 1962, W 27,540
1 Claim. (Cl. 4—185)

The present invention relates to a supporting frame for a bathtub or bathinette for babies.

The primary object of this invention is to provide a supporting frame for a bathtub or bathinette for babies, which permits such a bath-tub to be mounted safely wherever desired and even within a narrowly confined place.

Another object of the present invention is to provide a supporting frame of the referred to type, which is adjustable so that it may be placed on any support. At the same time, my invention has for one of its other objects the provision of a supporting frame that can be adjusted to the size of the bathtub or bathinette for babies, that is to be supported.

Still other objects will be apparent from the following description.

The supporting frame according to the invention comprises a pair of parallel narrow supporting boards which are connected so as to be adjustable to different distances from each other and are provided on their upper sides with suitable means for holding a bathtub or bathinette which is placed thereon, while on their lower sides they are provided with stop or holding members which are adjustable relative to each other in the longitudinal direction of the boards.

Such a frame may be placed, for example, on a normal bathtub and be connected thereto so as to be practically immovable. For this purpose, the stop or holding members may be adjusted in accordance with the width of the normal bathtub and are then locked on the supporting boards so that they will then engage with the inner walls of the tub and prevent the frame from shifting on the tub. When placed upon a table, the holding members may be fitted over the opposite edges of the table so as to grip the same between them.

One of the supporting boards may be provided with a pair of connecting boards which extend at right angles therefrom toward one side and have longitudinal slots in their other ends which are open at the outside and are adapted to slide over headed bolts or the like which are secured to the other supporting board.

Since the two supporting boards are thus adjustable to different distances from each other, the supporting frame may be adjusted so that the tub-holding means will grip any baby bathtub regardless of its length.

The slotted ends of the connecting boards which are secured to one of the supporting boards may rest directly on the other supporting board so that the two supporting boards will always be positively connected to each other.

The supporting boards may also be provided with longitudinal slots and the stop or holding members with bolts which extend through these slots and may be locked on the supporting boards by wing nuts. These holding members may thus be easily and quickly mounted on the supporting boards, adjusted to and locked at any desired distance from each other or removed from the supporting boards. The holding members may also be of an angular shape so as to permit them to be adjusted to distances greater or smaller than those between the longitudinal slots in the supporting boards.

One of the supporting boards may also be provided with a shelf container or the like which, if desired, may be removable and on which, for example, a piece of soap, a sponge, a washrag, or the like may be placed so as to be quickly available.

The means for holding the baby bathtub may consist of a pair of flexible straps, cords, wires, or the like, for example, of plastic, such as nylon. The two ends of each strap or cord are connected to one of the supporting boards by a pair of brackets at a distance from each other which is smaller than the length of the cord. In this manner the straps or cords embrace the ends of the bathtub and thus grip it tightly and securely.

The features and advantages of the present invention will become more clearly evident from the following detailed description thereof which is to be read with reference to the accompanying drawings, in which—

FIGURE 3 shows a cross section of a modification of a holding member; while

Figure 1:
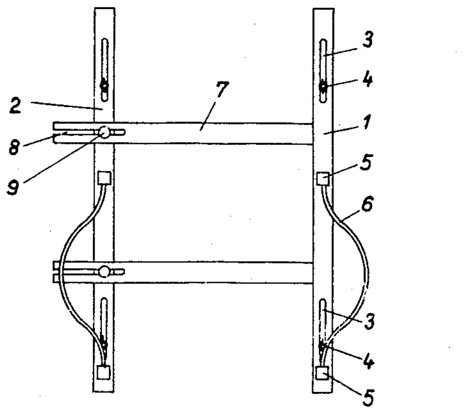
FIGURE 1 shows a top view of a supporting frame according to the invention.
Figure 2:
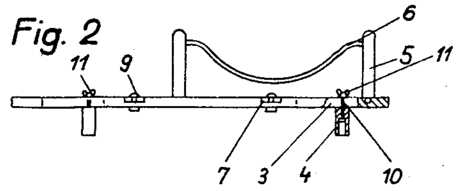
FIGURE 2 shows a side view thereof, partly in cross section.

As illustrated in FIGURES 1 and 2 of the drawings, the bathtub supporting frame according to the invention consists of a pair of parallel narrow supporting boards 1 and 2 which are provided near their ends with longitudinal slots 3 through each of which a bolt 10 extends which is secured to a stop or holding member 4 in the form of a short bar projecting from the lower side of the respective board 1 or 2. Each holding member 4 may be secured in the adjusted position within the respective slot 3 by a wing nut 11 on bolt 10. On the upper side of each supporting board a pair of posts 5 are mounted to which the ends of a flexible gripping strap, cord, or wire 6, for example, of plastic, are secured. This gripping strap or cord is longer than the distance between the posts 5.

The supporting board 1 carries a pair of connecting boards 7 which are secured thereto in a position so as to extend vertically to board 1 toward the same side. The free ends of these connecting boards 7 are provided with longitudinal slots 8 which are open at their outer ends and through which headed pins 9 extend which are slidable along slots 8 and are secured to the supporting board 2. If desired, pins 9 may be in the form of bolts which are provided with nuts for locking the supporting board 2 in the adjusted position in which the two flexible straps or cords 6 firmly grip the opposite ends of the baby bathtub.

Figure 3:
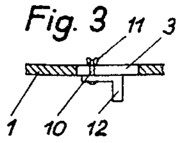

According to the modification as shown in FIGURE 3, the holding members are made in the form of angular members 12, each of which is adapted to be secured at the free end of one arm to the supporting board 1 or 2 by a bolt 10 which passes through a slot 3 in the respective supporting board and is provided with a wing nut 11. Since the vertical webs of these angular members 12 may be pivoted around bolt 10 toward one or the other side thereof when the wing nuts 11 are loosened, it is possible by means of these members to extend the range of their adjustability considerably beyond that of the length of slots 3 and in both directions thereof.

Figure 4:
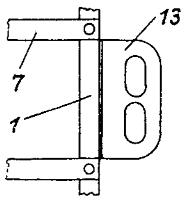
FIGURE 4 shows a top view of an additional shelf which is connected to one of the supporting boards.

As illustrated in FIGURE 4, a shelf or container 13 may also be connected to the supporting board 1 so as to project laterally therefrom. It may be either hinged to board 1 so as to be tiltable downwardly when not in use or it may be removably connected to board 1.

The bathtub supporting frame according to the invention may be placed, for example, upon the rim of a regular bathtub so that the supporting boards extend transversely thereto. The holding members 4 or 12 may then be adjusted so as to engage with the inner sides of the regular bathtub, whereupon the wing nuts 11 are tightened. The baby bathtub or bathinette is then placed upon the frame and the supporting board 2 is moved toward the supporting board 1 until the straps or cords 6 grip the opposite ends of the baby bathtub. After the baby has been given its bath and taken out of the baby bathtub, the latter only needs to be lifted at one end in order to empty it into the big bathtub underneath.

The bathtub supporting frame according to the invention is preferably designed so that all of its individual parts may be separated from each other. The connecting boards 7 may therefore also be removed from the supporting board 2 and the holding members 4 or 12 from the supporting boards 1 and 2, so that the various components of the frame may be packed into a small bundle or package which requires very little space when stored away or taken along on trips.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

A supporting frame for a baby bathtub, comprising (1) a pair of first boards extending in spaced and parallel relationship to be placed on a support, (2) another pair of second boards extending in spaced and parallel relationship perpendicularly to said first boards, (3) abutment means adjustably mounted on said first boards for safely holding said frame on any support, (4) first connecting means for permanently connecting each of said second boards, at one end thereof, and one of said first boards, (5) second connecting means for adjustably connecting each of said second boards, at the other end thereof, and the other one of said first boards, rendering the distance between said first boards adjustable, and (6) flexible means mounted on said first boards for holding the baby bathtub in place, when placed on said frame, by gripping around opposite portions of the baby bathtub, said flexible means being constituted by two stringlike members, the ends of each of said stringlike members being secured to one of said first boards at a distance from each other smaller than the length of the respective stringlike member, permitting each of said stringlike members to be slack.

References Cited by the Examiner

UNITED STATES PATENTS

| | | | |
|---|---|---|---|
| 733,847 | 7/03 | Kelly | 211—175 X |
| 1,379,152 | 5/21 | Windsor | 248—94 X |
| 2,096,395 | 10/37 | Galt. | |
| 2,468,742 | 5/49 | Faulhaber. | |
| 2,507,219 | 5/50 | Parker. | |
| 2,560,575 | 7/51 | Holland. | |
| 3,021,531 | 2/62 | Hinge. | |

LAVERINE D. GEIGER, *Primary Examiner.*

FRANK H. BRONAUGH, LEWIS J. LENNY, *Examiners.*